United States Patent [19]

Gannaway et al.

[11] Patent Number: 4,773,860
[45] Date of Patent: Sep. 27, 1988

[54] MULTIPLE APTITUDE TESTING DEVICE WITH DATA TERMINAL INPUT

[75] Inventors: Thomas W. Gannaway, Lower Merion, Pa.; Jeffrey A. Harris, Erial, N.J.

[73] Assignee: Jewish Employment and Vocational Service, Philadelphia, Pa.

[21] Appl. No.: 862,881

[22] Filed: May 13, 1986

[51] Int. Cl.$^4$ .............................................. G09B 7/06
[52] U.S. Cl. .................................... 434/335; 434/338
[58] Field of Search ........................ 434/335, 338, 339

[56] References Cited

U.S. PATENT DOCUMENTS

| | | | |
|---|---|---|---|
| 4,166,325 | 9/1979 | Weber | 434/338 |
| 4,259,788 | 4/1981 | Wilson | 434/338 |
| 4,522,599 | 6/1985 | Harte | 434/339 |
| 4,541,806 | 9/1985 | Zimmerman et al. | 434/338 |
| 4,557,694 | 12/1985 | Nelson | 434/339 |

*Primary Examiner*—Leo P. Picard
*Attorney, Agent, or Firm*—Caesar, Rivise, Bernstein, Cohen & Pokotilow

[57] ABSTRACT

An electronic testing device comprising a housing, test overlays, at least one data entry overlay, operating mode selector means and a microprocessor and associated circuitry. The testing device is arranged for either a testing mode of operation or a data entry mode of operation, with either mode being effected in response to the operating mode selector. The test overlays are each arranged to be releasably secured to said housing and bear indicia forming a plurality of questions and a plurality of possible answers corresponding to the questions. The overlays additionally comprise coding which cooperates with input on the housing to specify a set of correct answers to the questions when the device is in the testing mode. The housing additionally comprises plural electrical contacts arranged when actuated by an electrical probe to select a desired answer for each of the questions and for providing an electrical signal indicative thereof. The microprocessor and associated circuitry are responsive to the signals for determining the degree of correspondence between the answers selected and correct answers to the questions to produce scoring information. The data entry overlay defines a plurality of alphanumeric characters on the housing and associated with respective ones of the plural contacts, whereupon the actuation of each of said contacts provides an electrical signal indicative of a respective one of the plural alphanumeric characters. The signals representing the alphanumeric characters are provided to the microprocessor and associated circuitry so that the device can provide output signals representing selected data which was input during the data entry mode as well as the scoring data produced. These signals are used by an associated printer to print a report based on the test results. An optional computer or some other peripheral device can also be connected to the device's output.

15 Claims, 10 Drawing Sheets

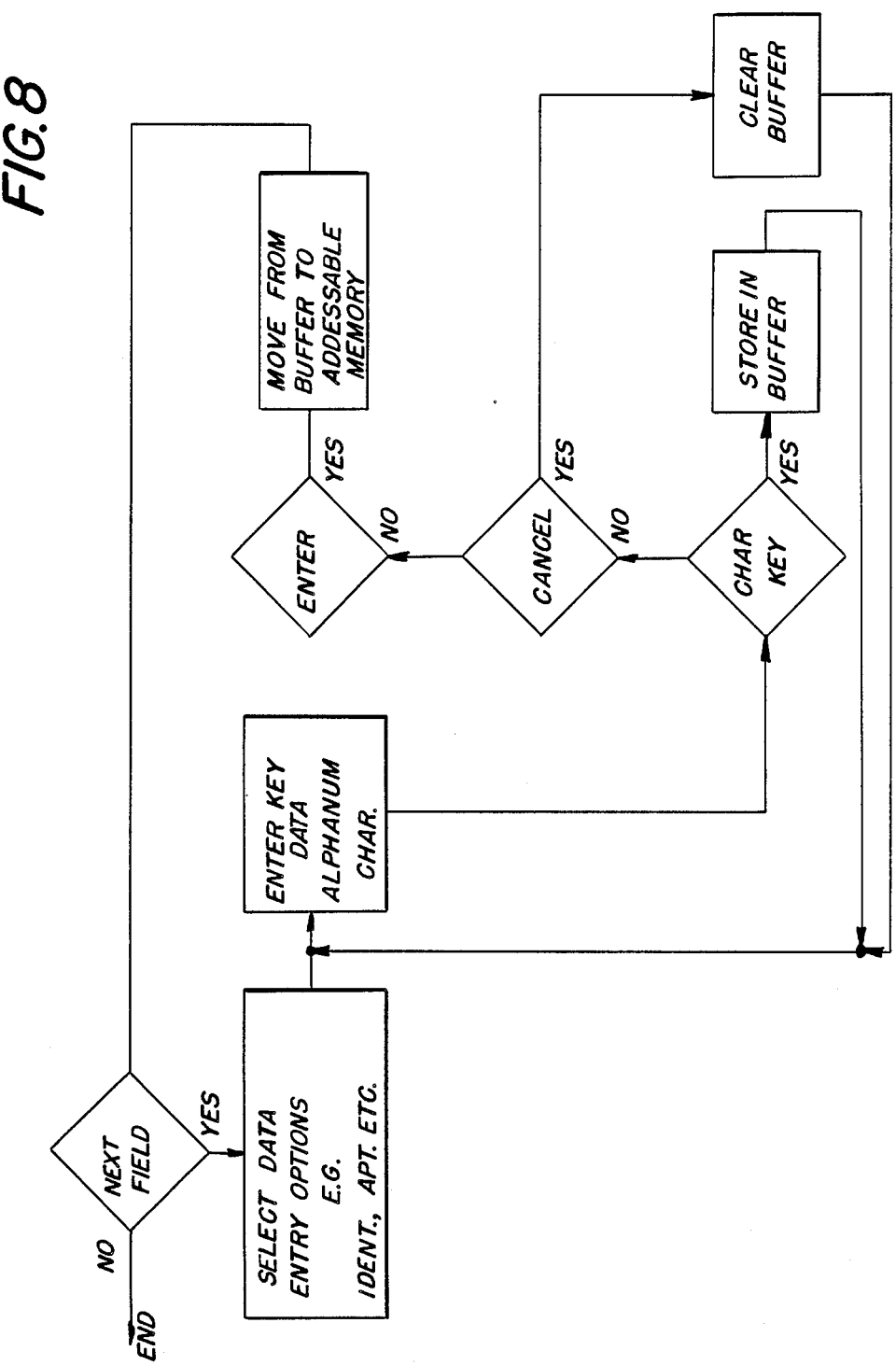

FIG. 9

MULTIPLE APTITUDE TESTING DEVICE WITH DATA TERMINAL INPUT

BACKGROUND OF THE INVENTION

This invention relates generally to testing devices more particularly to multi-function electronic testing devices.

In U.S. Pat. No. 4,541,806 (Zimmerman et al.), which is assigned to the same assignee as the subject invention, and whose disclosure is incorporated by reference herein, there is disclosed and claimed a multiple aptitude testing device for electronically evaluating an examinee's capacity or aptitude toward performing various vocational tasks. That device includes a test station which affords five general types of examinations, namely, objective question and answer tests, manual dexterity tests, finger dexterity tests, hand/eye coordination tests, and hand/eye/ foot coordination tests.

The question and answer tests entail the use of interchangeable overlays which contain the questions and the possible answers. The overlays contain plural openings exposing sensors (electrical contacts) on the housing corresponding to the potential answers to the questions. In addition indicators, such as LEDs, are associated with the sensors. The examinee selects the answer deemed correct by contacting an appropriate sensor on the housing with an electronically conductive answer probe. This action causes the illumination of the associated indicator to show the answer selected and stores the selected answers in the device's memory. The four dexterity tests are scored by counters which electronically measure the number of times the examinee is able to perform a manipulative task during a fixed period of time. An electronic comparator is included in the device for automatically grading the examinations based on the stored information and for displaying or printing a test score associated with each of the tests. The device also includes means for recognizing which test is being conducted based on which of the various overlays are mounted on the device.

While the device of the Zimmerman et al. patent is suitable for its test giving purposes, its report generating ability is quite limited.

OBJECTS OF THE INVENTION

Accordingly, it is the general object of the instant invention to provide a testing device which overcomes disadvantages of prior art vocational aptitude testing devices.

It is a further object of the instant invention to provide a testing device which is arranged to be operated in a data input mode, whereupon the device functions as a data input terminal for receiving and storing alphanumeric data.

It is a further object of the instant invention to provide a self-contained testing device which is arranged for two modes of operation, namely the data entry input mode and a testing mode.

It is still a further object of the instant invention to provide a self-contained testing device arranged to receive alphanumerical input data for storage and use, such as report generation, while also being arranged to test both cerebral as well as manipulative aptitudes of persons and for providing a report including information containing the alpha numeric imput data and the results of said test.

SUMMARY OF THE INVENTION

These and other objects of the instant invention are achieved by providing an electronic testing device comprising a housing, first and second indicia means, and operating mode selector means. The testing device is arranged for either a testing mode of operation or a data entry mode of operation, with either mode being effected in response to the operating mode selector means. The first indicia means comprise overlay means arranged to be releasably secured to said housing and bearing indicia forming a plurality of questions and a plurality of possible answers corresponding to the questions. The overlay means additionally comprises first coding means for cooperation with input means on the housing to specify a set of correct answers to the questions when the device is in the testing mode. The housing additionally comprises plural contact means mounted thereon. Each contact means is arranged when actuated to select a desired answer for each of the questions and for providing an electrical signal indicative thereof. The device additionally comprises computer based means responsive to the signals for determining the degree of correspondence between the answers selected and correct answers to the questions to produce scoring information. The second indicia means define a plurality of alphanumeric characters on the housing and associated with respective ones of the plural contact means, whereupon the actuation of each of said contact means provides an electrical signal indicative of a respective one of the plural alphanumeric characters. The signals representing the alphanumeric characters are provided to the computer based means, so that the device can provide output information including selected data which was input during the data entry mode as well as the scoring information produced.

DESCRIPTION OF THE DRAWING

Other objects and many of the attendant advantages of this invention will be readily appreciated as the same becomes better understood by reference to the following detailed description when considered in connection with the accompanying drawing wherein:

FIG. 8 is a flow chart showing the operation of the device during the data entry mode of operation.

DETAILED DESCRIPTION OF THE PREFERRED EMBODIMENT

Figure 1A:
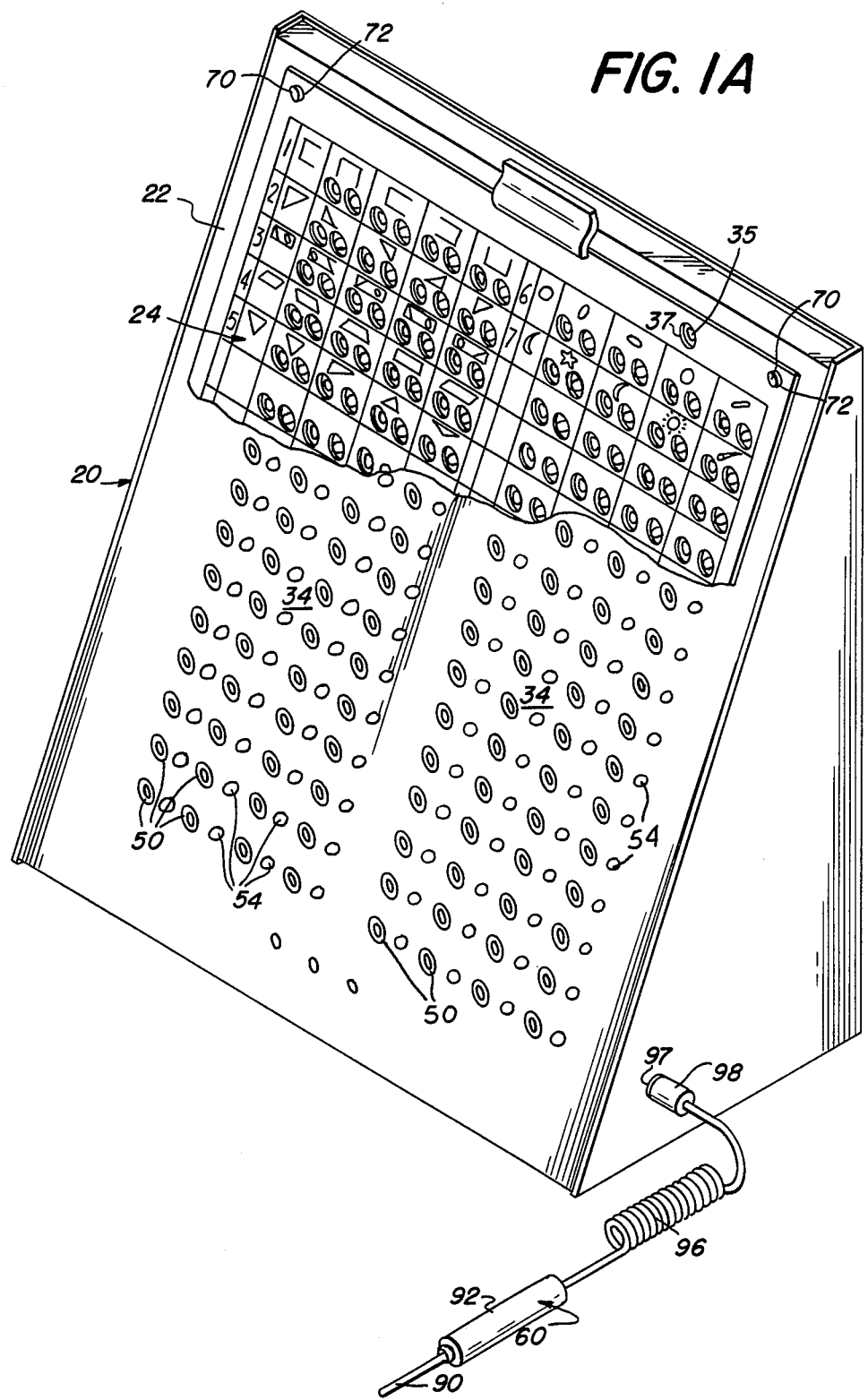
FIG. 1A is a perspective view of a multiple aptitude testing device constructed in accordance with the subject invention and including a portion of an exemplary question and answer overlay, all constructed in accordance with this invention.
Figure 1B:
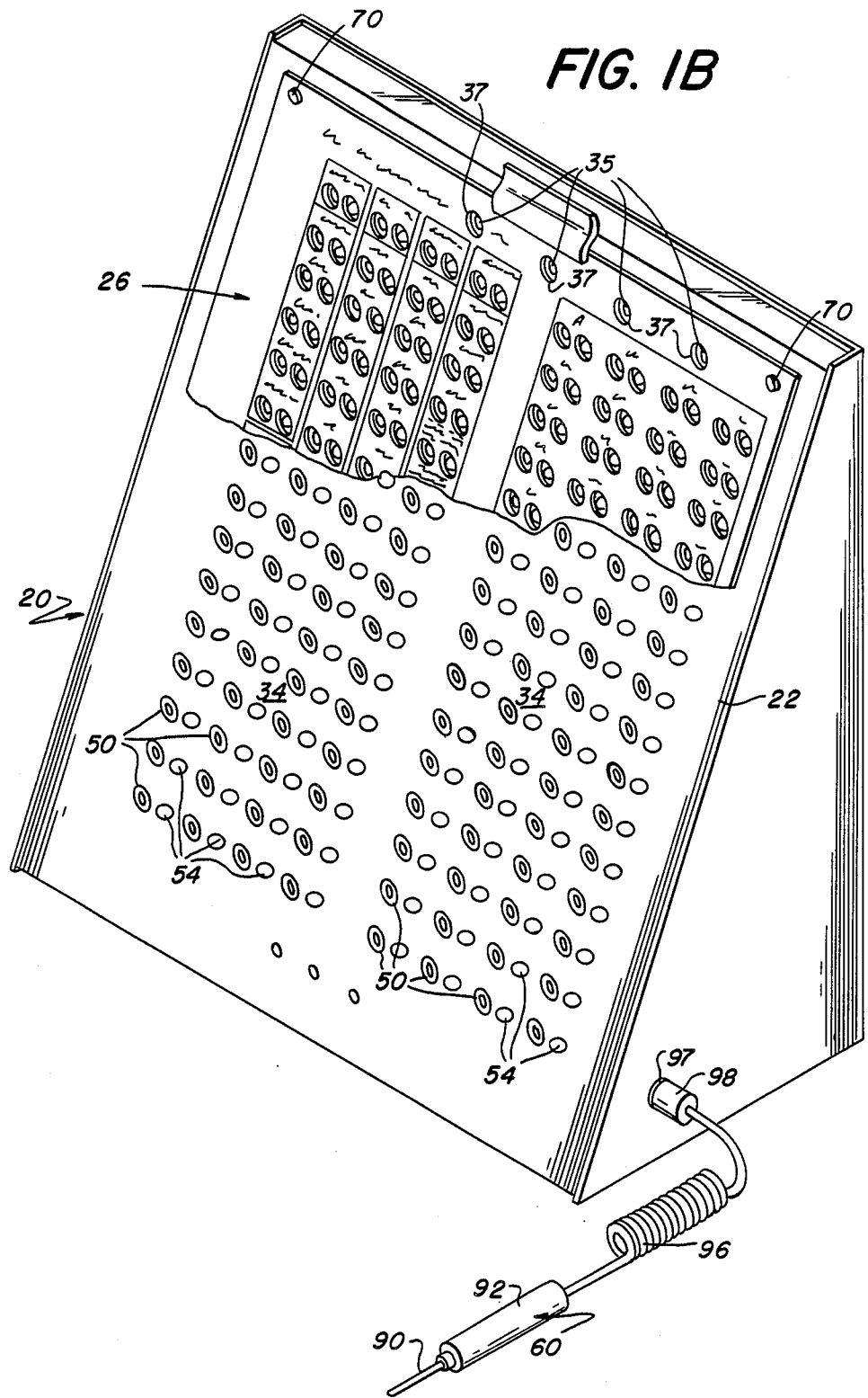
FIG. 1B is a perspective view, similar to that of FIG. 1A, but showing the device including a portion of a data entry overlay constructed in accordance with this invention.

Referring now in greater detail to the various figures of the drawing wherein like reference characters refer to like part, there is shown at 20 in FIGS. 1A and 1B a multiple aptitude testing device or unit constructed in accordance with the invention. The device 20 is arranged to operate in two modes, namely, a data entry mode (to be described later) and a test mode.

When the device is in its test mode it serves to evaluate the vocational aptitudes of an examinee based on his or her selected answers to a plurality of objective test questions, typically of the multiple choice type. Additionally, the device is designed to objectively evaluate a person's actual capacity for performing various tasks requiring motor skills (motor skills shall refer to manual dexterity, finger dexterity, hand/eye coordination and hand/eye/foot coordination) using various objects or attachments which the examinee must manipulate.

Inasmuch as the motor skills and dexterity testing aspects of the device do not constitute any part of the subject invention their details will not be described hereinafter, but reference should be made to the description thereof as found in U.S. Pat. No. 4,541,806 described earlier.

The unit 20 is entirely self-contained and does not require any separate question booklets, disposable answer sheets or writing elements. Rather, an overlay containing indicia establishing various questions and possible answers for a given test is arranged to be releasably mounted on the device in front of the housing. Plural electrical contacts, each establishing a respective answer to a question, are mounted on the front of the housing and are arranged to be actuated by an electrical probe to select the appropriate answer to each question. The overlay includes indicia bearing the questions and with four potential answers for each question. The overlay also includes plural openings, one for each answer, and which are disposed to expose an associated contact of the device, so that the probe can engage the contacts. The device also includes means for sensing which particular overlay is used in order that it may electronically evaluate the examinee's level of performance for the test defined by that overlay. I particular the device includes microprocessor-based means evaluator/control means for controlling the operation of the device for storing the answers given for each question and for scoring the test based upon correct answers stored in the device's memory. The device then provides a digital representation of the test score on digital display means (to be described later) or by printing the same as hard copy on a conventional printer (also to be described later).

As mentioned earlier the device 20 is also arranged to be operated in a data entry mode in order to enter information into it which may be desired for use to generate a custom report of the test results. To that end the device is constructed so that it can be configured to operate as a data entry terminal, whereupon strings of alphanumeric characters, such as the characters identifying the examinee, the date of the test, the test facility, remarks about the test, etc., can be input into the unit. This information is then available for subsequent use, such as the printing of a report describing the examinee's performance on a given test. The inputting of the alphanumeric data is effectuated in the embodiment disclosed herein through the use of data entry overlay means constructed similarly to the testing overlay means, but having different indicia thereon. The testing overlay means and the data entry overlay means will be described later.

Figure 2:
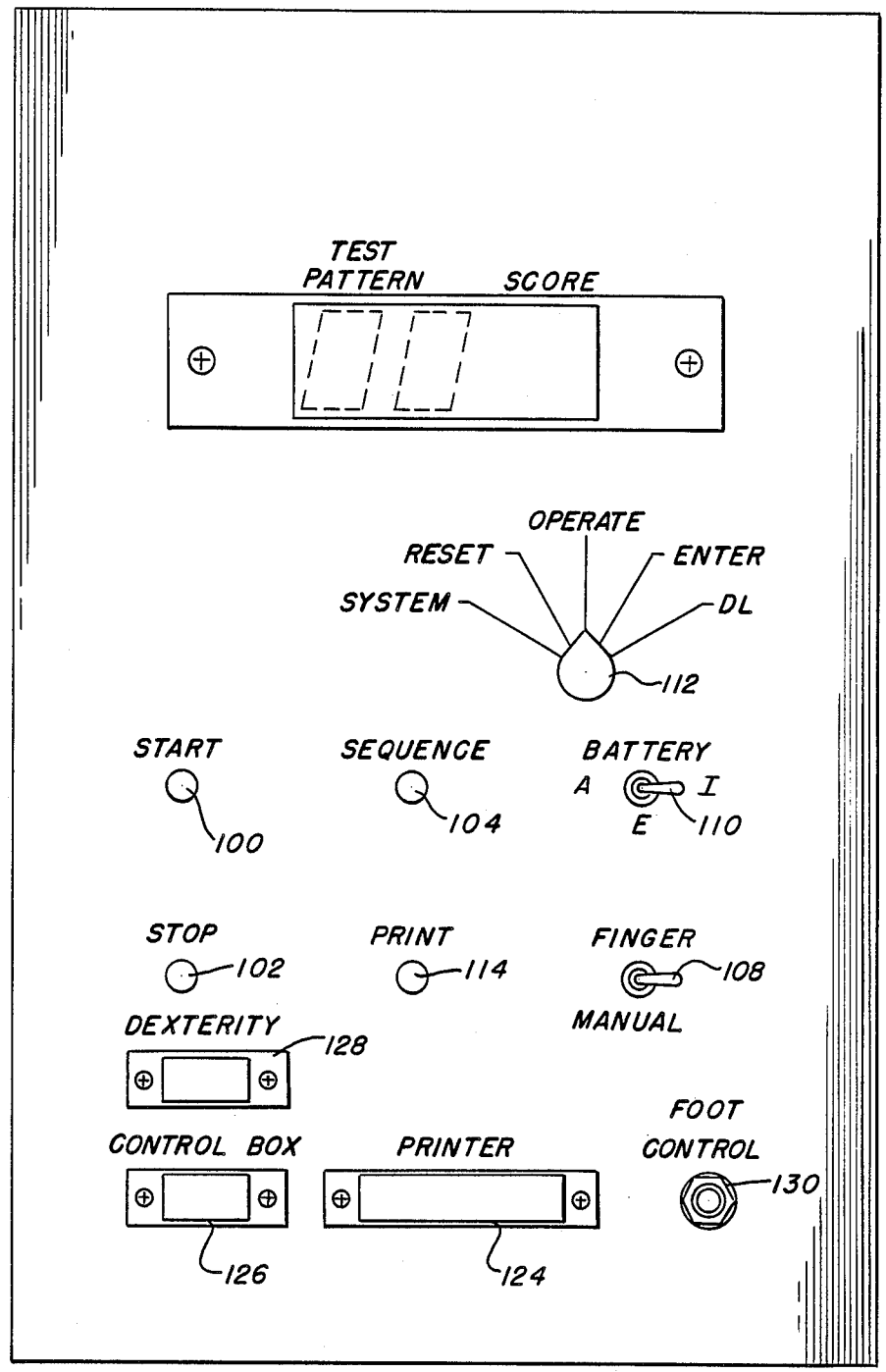
FIG. 2 is a rear view of the housing of the device shown an FIGS. 1A and 1B.

As can be seen in FIG. 1A, 1B, 2 and 3 the unit 20 basically comprises a housing 22, question and answer overlay means 24 (FIG. 1A), data entry overlay means 26 (FIG. 1B), probe means 60 (FIGS. 1A and 1B), selector means 30 (FIG. 3), evaluator/control means 32 (FIG. 3), sensor/indicator means 34 (FIGS. 1A and 1B), and digital display means 36 (FIG. 2). The evaluator/control means 32 basically comprises the heretofore mentioned microprocessor and associated components (to be described later) for effecting all of the control, processing and evaluation functions of the unit.

As indicated earlier the unit is arranged to be connected to a printer, that printer is denoted by the reference number 38. Further still the device 20 can be connected to a peripheral device, such as a optional computer 40, or to other auxillary components, if desired, via the use of a conventional RS232 serial port. Thus, reports regarding the test can be printed by the printer 38, or downloaded to the computer 40 for additional processing.

Prior to the administration of any particular test the device 20 is placed in its data entry mode of operation by the setting of a mode selector switch (the details of which will be described later), into the "Enter" position. The mode selector switch forms a part of the heretofore mentioned mode selection means 30. The data entry overlay 26 is then temporarily mounted on the unit.

The unit 20 then commences operation under the control of its microprocessor (to be described later) to automatically cycle through various categories or fields of information for which data can be entered and stored in the system. In this regard indicator elements, e.g., LEDs (to be described later) associated with the various information fields as defined by the overlay means 26 and for which data may be input, are illuminated in a predetermined sequence to prompt the test operator to input data into that field(s). The operator, may then enter any data into the any field, either in the order presented in the normal cycle of operation, or any other order. This action is accomplished by engaging with the electrical probe the contact of the sensor/indicator means 34 associated with the character to be input. Each contact engaged by the probe causes a signal to be provided to the evaluator/control means 32 and which signal is indicative of the associated alphanumeric character. In addition, the LED associated with the contact which was engaged illuminates to show the examinee the character which was input. This operation continues until all of the characters desired to be entered into a particular field are selected. The signals indicative of the characters selected are stored in a temporary buffer in the unit's evaluator/control means 32. The examinee can, if desired, cancel the entry and clear the buffer of signals or cause the signals in the buffer to be entered into the device's memory for later access, e.g., use in printing a report.

Once all the data for the fields desired have been entered into the system the unit 20 is ready for conducting a test. To that end the mode selector switch is then switched to the question and answer position, i.e., the "Operate" position.

To administer a question and answer type test, e.g., a multiple choice test, the question and answer overlay 24 containing questions and a plurality of possible answers to each question is temporarily mounted on the housing. The examinee then selects the answer he or she deems correct for each question by contacting the electrical contact of the sensor means 34 associated with the answer deemed appropriate. Upon the completion of the examination, the evaluator/control means 32 electronically compares the selected answers with a predetermined set of correct answers stored in the unit's memory and then produces a signal indicative of the results of the test; i.e., a signal indicative of scoring information. This signal is used by the display means 36 to display the test score.

The printer 38 can be used to print out a report including, not only the test score, but also various data input during the input mode of operation, to thereby produce a customized report for that particular test(s). The report information can also be downloaded to the optional computer 40 for further processing or use.

The electronic evaluator/control means 32 is disposed in the housing and includes a plurality of electronic circuits, most of which will not be described herein since a description of the same can be found in U.S. Pat. No. 4,541,806. Thus, only those electronic circuits relevant to the operation of the device in the data entry terminal mode will be specifically discussed herein.

When the device is in the testing mode it is arranged to be used in combination with a plurality of interchangeable question and answer overlays 24. Each overlay contains up to 30 multiple choice questions. In this regard each question contains up to four possible answers from which the examinee can select the one correct answer. Each overlay basically comprises an opaque, semi-flexible sheet made from an extrudable molded plastic, such as polystyrene, upon which indicia forming the questions and the associated answers are printed. The "question" may consist of a depicted shape, e.g., an equilateral triangle, while the "answers" consists of plural shapes, only one of which being an equilateral triangle. Thus, the correct "answer" to the "question" is the equilateral triangle shape. The overlays, of course, may be constructed of a wide variety of other durable materials capable of containing or representing written material. Alternatively the questions and answers may be secured to the overlay by means of adhesive labels.

As will be described later the test device is arranged to automatically recognize which overlay out of as many as fifteen overlays is being used. The electronics of the system includes memory means for storing an equal number of answer patterns.

As will be appreciated any number or combination of tests may be given to an examinee. Moreover the test need not be restricted to use for measuring vocational aptitudes since the question and answer examinations may be used for any purpose whatsoever, such as for measuring a person's intelligence quotions, knowledge of a particular subject area, etc.

Referring now to FIG. 1A the housing can be seen to be generally triangular shaped and includes a front wall or panel 22, a pair of identical generally triangular shaped sidewalls 42, a bottom wall (not shown), and a rear wall 44 (FIG.2). The front panel is generally planar and extends at approximately a 60° angle to the horizontal to promote ease of vision and operation.

As can be seen the heretofore identified sensor/indicator means 34 comprise one hundred twenty individual sensors or contacts 50 which are mounted on the front panel 22 in a rectangular array. Also mounted on the front panel are one hundred twenty LED's 54, each associated with a respective contact 50 of the sensor means 34. Each contact 50 and its associated an LED 54, are arranged in thirty groups of four contacts and four LED's each. Moreover, the sensor contact groups are divided into two sections of fifteen groups each, one section arranged in a vertical column on the left hand side of the front panel 22, and the other section similarly arranged on the panel's right hand side.

Each of the sensor contacts 50 is an electrical contact recessed within a hole in the front panel and is electrically connected to associated circuitry within the housing and which will be described later. When a particular overlay 24 containing questions and possible answers is mounted on the front panel of the housing, each possible answer on the overlay is aligned to correspond with a respective contact 50 and LED 54 pair. Thus, the overlay contains one hundred twenty holes corresponding in position to the one hundred twenty contacts and one hundred twenty holes corresponding to the one hundred twenty LED's 54, respectively.

Actuation of each sensor contact 50 is accomplished by the heretofore mentioned probe, now referred to by reference numeral 60. Thus, to select a particular answer the probe 60 is inserted through a hole in the overlay sheet in order to touch the corresponding contact 50. The probe 60 is electrically connected to the circuitry within the housing and in the embodiment shown herein is at ground potential. When a contact 50 is touched with the probe 60 the electrical potential of the contact is brought to ground. This signal is provided, via the circuitry to be described later to the microprocessor in the electronic evaluator/control means to indicate that the answer associated with that particular contact has been selected. The contacting of a sensor contact 50 with the probe also results in the circuitry of the system illuminating the LED 54 associated with that contact.

In order to mount the overlay 24 on the housing a pair of mounting pegs 70 are provided to project through corresponding holes 72 in the overlay. Thus, when the overlay is mounted on the housing via the pegs 70, it is precisely positioned.

When the device is in the testing mode it is arranged to automatically recognize which of the particular plural question and answer overlays 24 is being used at that particular time. To that end the device includes mode sensor means 35 comprising a set of four optical sensors, e.g., phototransistors, to be described later, which coact with circuitry, also to be described later, to electronically ascertain whether an overlay is in place, and, if so, which overlay is present. To accomplish that end, each of the overlays is coded. In particular each overlay contains up to three holes 37 at positions corresponding to any of the phototransistors 35. Thus, ambient room light passing through the holes is received by the phototransistors. As will be described later the phototransistors and associated components produce a binary code signal indicative of the particular overlay which is used. The microprocessor and associated circuitry of the evaluator/control means 32 senses that binary code signal whereupon the answers corresponding to that group of questions are made available from associated memory means for comparison with the answers which are provided by the examinee during the taking of the test. The binary coded signal is also utilized by the circuitry to cause the digital display means 36 to display an identification number associated with the test being run.

As can be seen in FIGS. 1A and 1B, the probe 60 basically comprises an elongated member having a conductive tip 90, an electrically insulated handle 92, and a male electrical plug 98. The plug is electrically connected to the tip by means of flexible electrical conductor 96. The probe is arranged to be readily attached to or removed from the side of the housing of the device. To that end situated on the sidewall of the housing is a female connector 97 arranged to receive the mating male plug 98.

Referring now to FIG. 2, the rear wall 44 of the device 20 is shown. As can be seen the rear wall includes various operational controls, e.g., a start button (switch) 100, a stop button (switch) 102, a sequence button (switch) 104, a manual/finger dexterity select switch 108, a test battery selector switch 110, the heretofore mentioned mode selector switch now designated by the reference numeral 112, a print button (switch) 114, the heretofore identified rear panel digital display means 36, a cable connector 124 for a printer, a cable connector 126 for a control box, and a cable connector 128 for a dexterity testing box. In addition the back panel includes a jack 130 for a foot control.

The switches 100, 102, 104, 108, 110, 112 and 114 make up a portion of the heretofore identified mode selector means 32.

The mode control switch 112 is a rotary contact switch including five positions, namely, "System", "Reset", "Operate", "Enter" and "DL" (Download). The connection of the switch 112 to the evaluator/control circuitry 32 will be described later. Suffice it for now to state that when the switch 112 is in the "System" setting or position the circuitry of the device 20 causes all of the front panel LED's 54 as well as the digits of the rear panel display 36 to illuminate, thus assuring the test administrator that all of the LED's and display means are functioning. Once the test administrator is satisfied that the device 20 is functioning properly, the mode selector switch 112 is then turned to the "Reset" position. This action causes the circuitry of the system to clear or reset, whereupon all of the LED's 54 on the front panel extinguish and the rear panel display 36 illuminates with the two digit number "00" (see FIG. 2). At this point the device is cleared and is ready to be switched into the testing mode of operation for giving a test.

Before describing a typical testing operation, the operation of the device 20 in its data entry terminal mode will be described. As noted earlier it is in this mode that data can be entered into the unit for later availability, e.g., to print a report summarizing the test results. To that end the mode selector switch 112 is rotated to the "Enter" position and the data entry overlay 26 (FIG. 1B) is mounted on the front panel of the housing. This configures the unit's front panel as a "keyboard" or "keypad" for effecting the inputting of alphanumeric characters into any one of numerous data fields (categories). In particular the data input overlay 26 includes four openings 37 to allow light to reach all four of the phototransistors making up the mode sensor means 35, whereupon signals indicative of that condition are provided to the evaluator/control means 32. When the mode control switch 112 is in the "Enter" position the evaluator/ control means 32 places the system in the data entry mode.

It must be pointed out at this juncture that in the embodiment shown herein the data entry overlay 26 includes the same openings for the contacts 50 and LED's 54 as a test overlay. However, the data entry overlay carries the indicia located adjacent those openings showing which of the contacts or sensors 50 define which alphanumeric characters and which of the other contacts 50 define which fields. Moreover, as will be appreciated by those skilled in the art, the indicia identifying the alplha-numeric characters and/or fields can be provided, e.g., printed, stenciled, etc., directly on the front panel of the housing adjacent the respective contacts 50 or LEDs 54.

Figure 9:
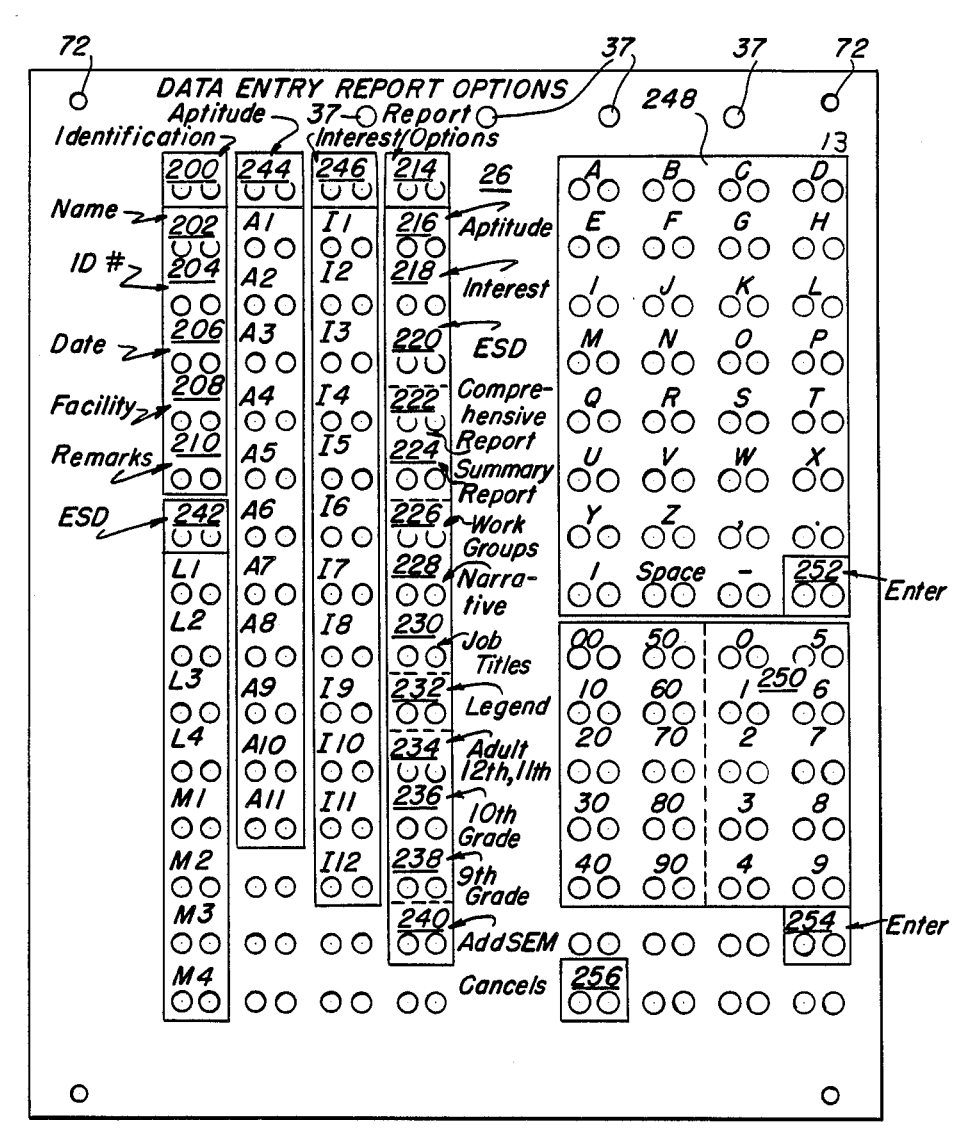

All the indicia provided on the data entry overlay 26 will not be described in complete detail herein inasmuch as such is not necessary for the understanding of this invention. Suffice it to say that the indicia on the data entry overlay 26 is provided in two groups. Thus, as can be seen in FIG. 9, the left hand group of indicia and associated openings for access to contacts 50 define various fields for which data can be entered and stored in the unit 20. For example, when the overlay 26 is in place a group of contacts 50 on the left side of the housing form a group of "Identification" fields 200, with respective contacts thereof defining the "Name" field 202, the "Identification Number" field 204, the "Date" field 206, the "Facility" field 208, and the "Remarks" field 210. Another group of contacts on the left side of the panel defines the "Report Options" group of fields 214, with the contacts thereof defining the "Aptitude" field 216, the "Interest" field 218, and other subfields such as the "ESD" (Educational Skills Development) field 220, the "Comprehensive Report" field 222, the "Summary Report" field 224, the "Work Groups" field 226, the "Narrative" field 228, the "Job Titles" field 230, the "Legend" field 232, the "Adult-12th" field 234, the "10th Grade" field 236, the "9th grade" field 238, and the "Add SEM" field 240. Other groups of contacts on the left side of the front panel define the "ESD" test group of fields 242, the "Aptitude" test group of fields 244 and the "Interest" test group of fields 246, with the respective contacts of those groups defining various test subfields therein, e.g., test A1, test A2, etc.

The group of indicia and associated openings on the right hand side of the overlay define several fields, such as a field 248 of English alphabet characters and punctuation marks, (i.e., ",", ".", " " and "-"). Another group of indicia and openings in the right hand side of the overlay 26 defines a numeric field 250, with the various contacts thereof defining the numerical characters 0-9, 00, 10, 20, 30, 40, 50, 60, 70, 80, and 90. Further still in the right side of the overlay are indicia and openings defining various data entry functions, such as, "Enter" 252 (to enter the alphabetical and punctuation characters into the unit), "Enter" 254 (to enter the numerical characters into the unit), and "Cancels" 256 (to cancel either alphanumeric or punctuation characters).

When the unit 20 is in the data entry mode of operation and the Start button 100 (FIG. 2) is depressed, the electronic circuitry of the unit automatically sequences through the fields in a predetermined order as established by programs forming a portion of the evaluator/control means and stored therein. For example, the LED 54 associated with the contact 50 of the "Identification" field 200 and LED 54 associated with the "Name" field 202 contact 50 are illuminated. These actions ready the system for receipt of alphanumeric characters. If the test administrator wants to enter alphanumeric characters identifying the person being tested, the probe is then brought into engagement with the contacts associated with the alphanumeric characters. Assuming that the name of the person to be tested is "John Doe", the test administrator then brings the probe into sequential engagement with the contacts associated with the letter characters "J", "O", "H", "N", the space character " ", and then the letter characters "D", "O", and "E" of the character group field 248. This action causes signals indicative of those letters to be stored in a temporary buffer or memory (not shown) in the evaluator/control means.

Assuming all of the characters are entered properly, as evidenced by the illumination of the associated LED's, the test administrator then brings the probe into contact with the contact 50 of the "Enter" function 252. This action causes the evaluator/control circuitry to move the signals from the temporary buffer into the system memory (also in the evaluator/control means) for later availability. After the entry of the "Name" data, the microprocessor in the evaluator/control means automatically sequences to the "ID Number" field 204, whereupon a identification number can be entered in the same manner as the "Name" data, except that the data entered will be from the number field 250.

Should the test administrator ever wish to go out of the order from the normal sequence of operation all, that is required is to touch the probe 60 to the contact 50 of the desired field for which an entry is to be made.

The test administrator can also enter information as to scores achieved in previous tests conducted on that examinee by first touching the contact for the appropriate "ESD" "Aptitude" or "Interest" test fields, 242, 244 and 246, then touching the particular subfield contact, e.g., test A1, contact, then entering the appropriate test scores attained by touching the appropriate contacts for the numeric characters of field 250, and then touching the "Enter" field 254.

In accordance with a preferred embodiment of this invention the test administrator can customize a report to be generated by the selection of the various "Report Options" brought into play by the contacts 50 of the "Report Options" fields 214–240. Thus the evaluator/control means 32 includes means (not shown) for establishing various types of report formats, depending upon the option selected.

After all the data has been entered, the test administrator can then commence the giving of a test. This is accomplished by removing the data entry overlay 26 and replacing it with an appropriate question and answer overlay 24 (FIG. 1A). The mode selector switch 112 is then switched to the "Operate" position and a two digit number identifying the particular test being run (as determined by the code openings 37 in the overlay) appears on the rear panel display 36. The test administrator initiates the testing process by depressing the "Start" button whereupon the examinee selects the answer to any particular question by inserting the tip 90 of the answer probe 60 through the hole in the overlay to engage the contact 50 for the answer desired. This action produces a signal indicative of the answer selected and that signal is provided to the evaluator/control means 32 for storage and subsequent use. The examinee repeats this process for each question on the test until the test is stopped by either the test administrator, or automatically by the console or the operation of a master control unit (not shown).

The master control unit will not be described herein but reference to such a description can be found in U.S. Pat. No. 4,541,806. That unit is connected to unit 20 via the control box cable connector 126 (FIG. 2). When a master control unit is not connected to the device the examination continues until such time as the console automatically terminates the test or the test administrator terminates the test by depressing the "Stop" button (switch) 102 on the rear panel. This provides a signal to the evaluator/control means 32 which terminates the examination by preventing the examinee from selecting and/or changing any answers. All of the illuminated LED's on the front panel are extinguished at this point and all of the answers which were stored in memory in the evaluator/control means are sequentially compared to the correct answers (the correct answers being stored in the evaluator/control mean's memory.)

Each question deemed correctly answered is counted by the evaluator/control means 32 and a score value is given. Each question either incorrectly answered or left unanswered is ignored. The test score, that is the number of correct answers, is also stored in memory along with the test number identifying the particular test to which the score relates.

At this point the test administrator either administers another examination or terminates the test section and prints out a report on the basis of the test. The printout of the report is effected by pressing print button 114 on the rear panel, whereupon the signals indicative of the contents of the report and including the information entered during the data entry mode are provided through the printer cable connector 124 to the printer 38 for producing a hard copy of the report.

Figure 3:
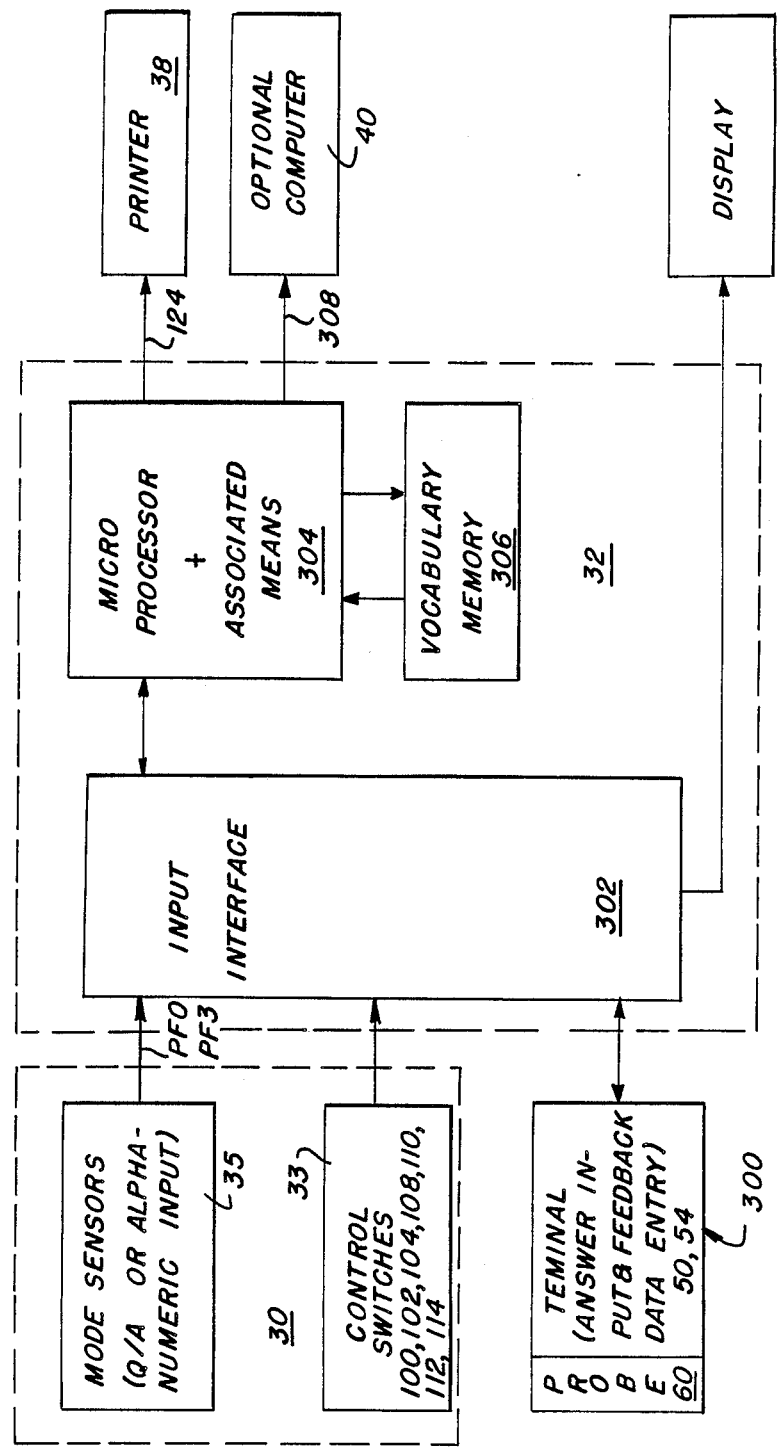
FIG. 3 is a block diagram of the system as configured during the data input mode of operation.

Referring now to FIG. 3, there is shown a block diagram of the electrical/electronic circuitry making up the device 20 as it operates as a data entry terminal. To that end, as can be seen in FIG. 3 the relevant portion of unit 20 basically comprises the heretofore discussed mode selector means 30, the evaluator/control means 32, a keyboard or keypad entry unit 300 (made up of the contacts 50, associated LEDS 54, probe 60 and the data entry overlay 26), the display 36, the printer 38, and the optional computer 40.

The mode selector means 30 basically comprises the switches 100, 102, 104, 108, 110, 112 and 114, hereinafter collectively referred to as control switches 33, as well as test/data overlay mode sensors income 35 (to be described later).

The evaluator/control means 32 basically comprises an input interface circuit 302, a microprocessor and associated means 304, and vocabulary memory means 306.

The mode selector switch 112 and the other control switches provide inputs to the input interface circuit 302 to establish the appropriate (desired) operation of the unit 20.

The terminal or keypad entry unit 300 provides signals to the input interface circuit 302 indicative of the contacts 50 touched by the probe 60, while also receiving back signals from the input interface circuit 302, to effect the illumination of the associated LED's 54 on the front panel. Signals from the input interface circuit 302 are also provided to the back panel display 36. The input interface circuit 302 also sends and receives signals to/from the microprocessor and associated means 304. The microprocessor and associated means 304 is also coupled to a vocabulary memory 306 for providing signals thereto and receiving signals therefrom relating to data, e.g., answers, stored in the system. Moreover, the signals from the microprocessor can be provided to either the printer 38 via cable connector 124 and its associated cable (not shown) or to the optional computer 40, via the heretofore mentioned RS 232 serial bus and now designated by reference number 308.

Figure 4:
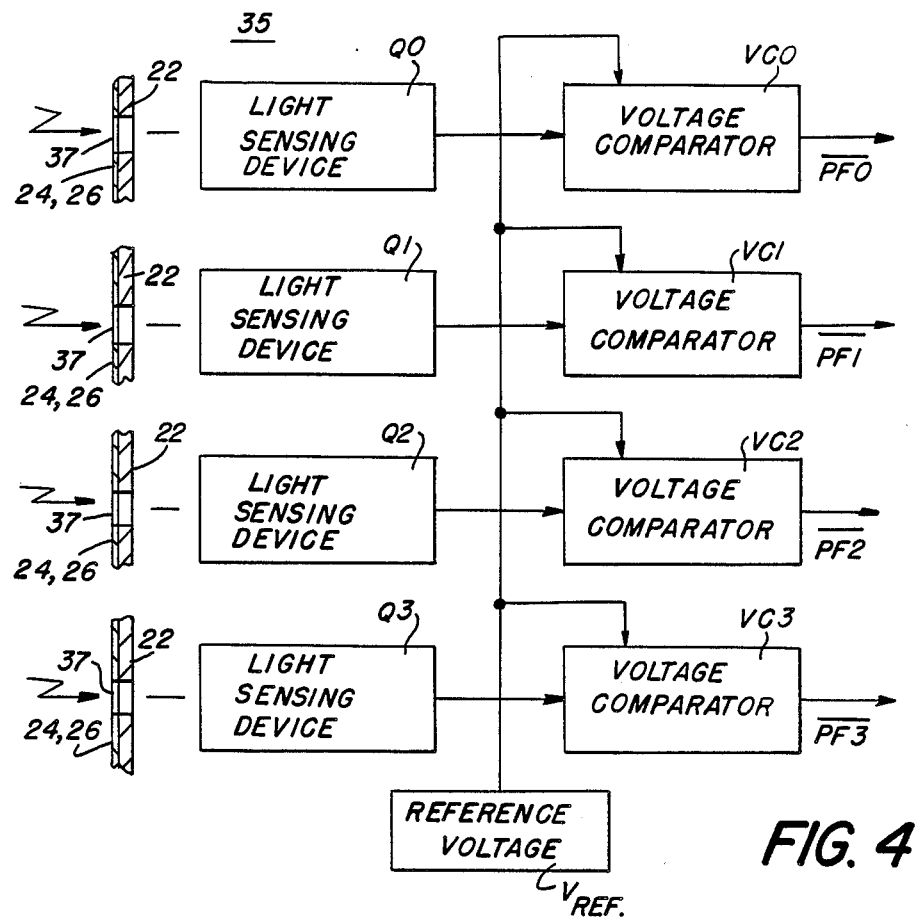
FIG. 4 is a block diagram of the mode selector block shown in FIG. 3.

In FIG. 4 there is shown in block diagram form the circuitry making up the test/data overlay mode sensors 35. As can be seen therein, the mode sensors include four light sensing phototransistors, Q0, Q1, Q2 and Q3. Each phototransistor is disposed behind an opening in the front panel of the housing 22 and is arranged to be either covered by a portion of the overlay mounted on the housing or exposed to light via an opening 37 in the overlay. The output of each of the phototransistors is provided as an input to a respective voltage comparator circuit VC0, VC1, VC2, and VC3. Another input to each of the voltage comparators is provided by a reference voltage VREF. The output of the four voltage comparators and VC0-VC3 defines a four bit word made up of the digitals signals $\overline{PF0}$, $\overline{PF1}$, $\overline{PF2}$, and $\overline{PF3}$. These signals identify to the evaluator/control means 32 which particular test is being established by a test overlay 24 or whether the unit is in the data entry mode (as established by the data entry overlay 26).

Figure 5:
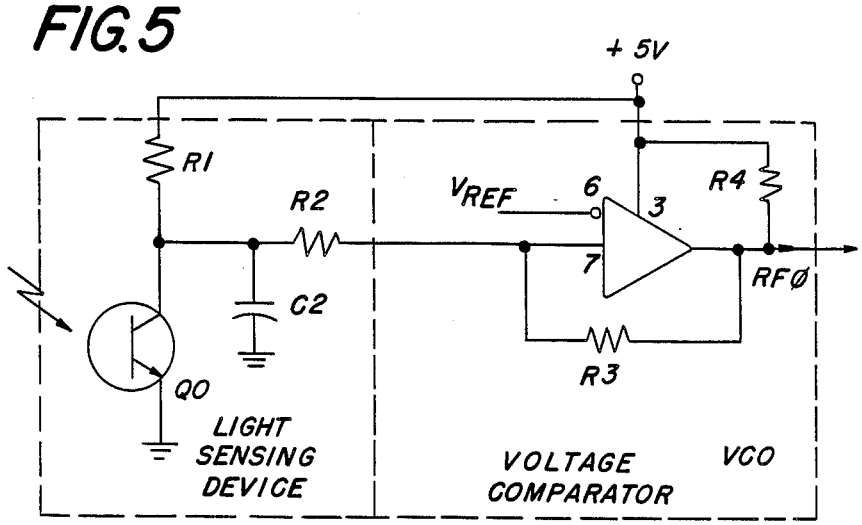
FIG. 5 is a schematic diagram of the mode selector block shown in FIG. 4.

Referring to FIG. 5 the details of a typical phototransistor e.g., Q0 and its associated voltage comparator (VC0) will now be described. As can be seen, the emitter of phototransistor Q0 is connected to ground and its collector is connected to the junction of a resistor R1 and a capacitor C2. The other side of capacitor C2 is connected to ground. The other side of resistor R1 is connected to a +5 volt bias. The common junction of the collector of phototransistor Q0 and the capacitor C2 is also connected to one side of a resistor R2. The other side of resistor R2 is connected to input pin 7 of an operational amplifier forming a portion of the voltage comparator VC0. The voltage comparator is of any suitable type, such as a type LM339 sold by National Semiconductor, Inc. Pin 7 of the VC0 is connected to one side of a feedback resistor R3, the other side of which is connected to output pin 1 of the VC0. The reference voltage VREF is provided to the inverting input pin 6 of the VC0. The +5 volt bias is also connected to pin 3 of the operational amplifier and to one side of a resistor R4. The other side of resistor R4 is connected to VC0 output pin 1 and to output line $\overline{PF0}$.

Thus, as will be appreciated by those skilled in the art when light is received by the phototransistor Q1 and the signal provided to the voltage comparator, via resistor R6, exceeds the reference voltage VREF the output signal $\overline{PF0}$ goes low.

Figure 6:
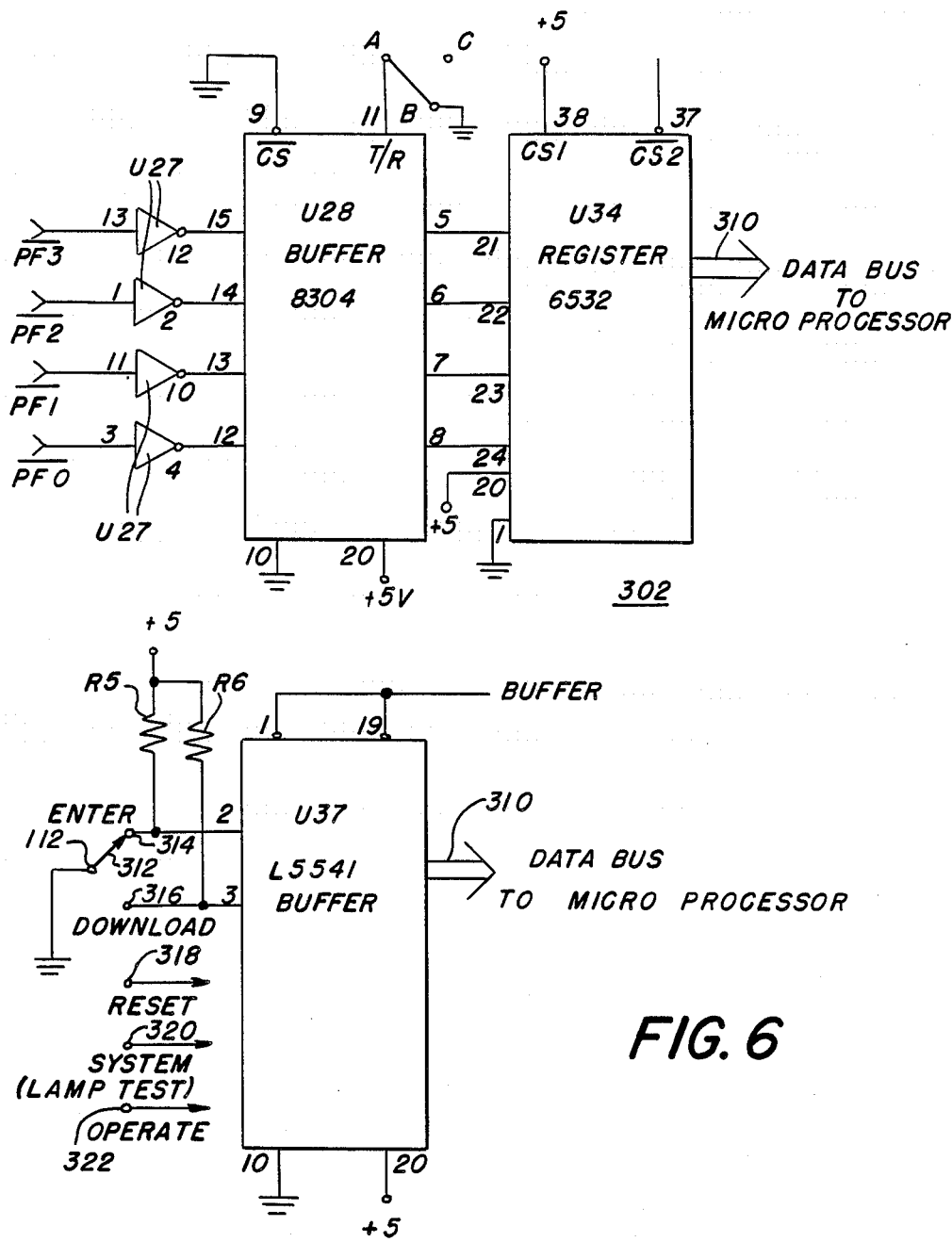
FIG. 6 is a schematic diagram of the imput interface block shown in FIG. 3.

The signals of $\overline{PF0}$ to $\overline{PF3}$ indicative of the test being given or the data entry mode operation are provided as inputs to the input interface circuit 302 (FIG. 6). This circuit buffers the input signals and supplies them to a register where they are stored for availability by the microprocessor in the evaluator/control means 32. In particular the stored signals are provided via a data bus 310 to the microprocessor. To that end, as can be seen in FIG. 6 signals $\overline{PF0}$, $\overline{PF1}$, $\overline{PF2}$ and $\overline{PF3}$ are provided to pins 3, 11, 1, and 13 respectively, of a quad Schmidt Trigger integrated circuit U27. The circuit U27 is of any suitable type, such as type 74LS14 sold by Texas Instruments, Inc. The output of the quad Schmidt trigger U27 is provided, via pins 4, 10, 2 and 12 to pins 12, 13, 14, 15, respectively, of an integrated circuit Octal Bus Transceiver U28. That circuit can be of any suitable type, such as type DP8304BN sold by Advanced Micro Devices, Inc. That circuit buffers the signals provided to its input and provides the buffered signals at its output pins 8, 7, 6, and 5, respectively. These pins are directly connected to input pins 24, 23, 22, and 21, respectively, of a integrated circuit Peripheral Controller U34. That circuit can be of any suitable type, such as a type R6532P sold by Rockwell International. The output of U34 is provided on the data bus 310 for availability by the microprocessor.

As noted earlier the control switches also provide inputs to the input interface circuit 302. To that end as shown in FIG. 6 the input interface includes an integrated circuit Bus Driver U37. That circuit is of any suitable type, such as a type 74LS541N sold by Motorola, Inc., and which is connected to the mode selector switch 112. As noted earlier the selector switch 112 is a five position rotary switch, including a movable contactor 312 and fixed contacts 314, 316, 318, 320 and 322, defining the "Enter", "Download", "Reset", "System-lamp test" and "Operate" modes, respectively.

As can be seen the "Enter" contact 314 is connected to pin 2 of the integrated circuit chip U37. Pin 2 of buffer U37 is also connected to one side of a resistor R5. The other side of the resistor R5 and one side of another resistor R6 are connected together to the +5 volt bias. The "Download" contact 316 is connected to pin 3 of the chip U37 and to the other side of resistor R6. The "Reset" contact 318, the "System (Lamp Test)" contact 320 and the "Operate" contact 322 are connected to other portions (not shown) of the circuitry of the evaluator/control means 32. The output of the buffer U37 is provided to the data bus 310 for use by the microprocessor.

Thus, it should be appreciated that when the mode selector switch 112 is in the position wherein its movable contactor 312 is in engagement with the "Enter" contact 314, that contact is grounded, thereby providing a low input signal to pin 2 of the chip U37. This signal then appears on the data bus 310 and is used by the microprocessor to arrange the system for receipt of alphanumeric input data (providing, of course, that light reaches all of the four phototransistors forming the mode sensors 35 to indicate that the data/entry overlay 26 is in place).

When the switch 112 is rotated to the "Download" position, pin 3 of the chip U37 is brought to ground, so that a low signal is provided on the data bus 310 to the microprocessor, whereupon information stored regarding a test is downloaded via the RS232 serial port 308 to the optional computer 40.

Figure 7A:
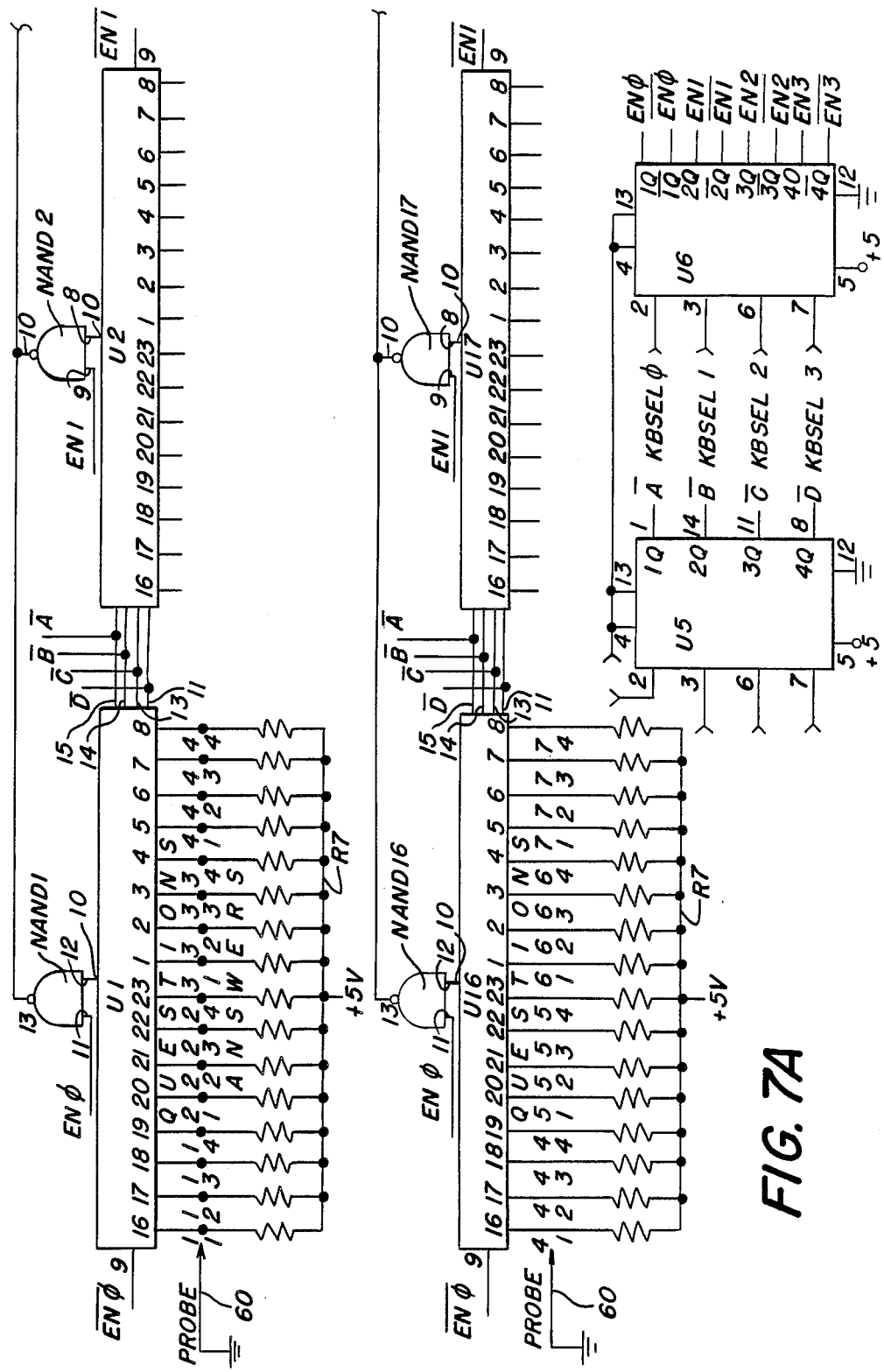
FIG. 7 is a schematic diagram of a portion of the components shown in the block diagram of FIG. 3.
Figure 7B:
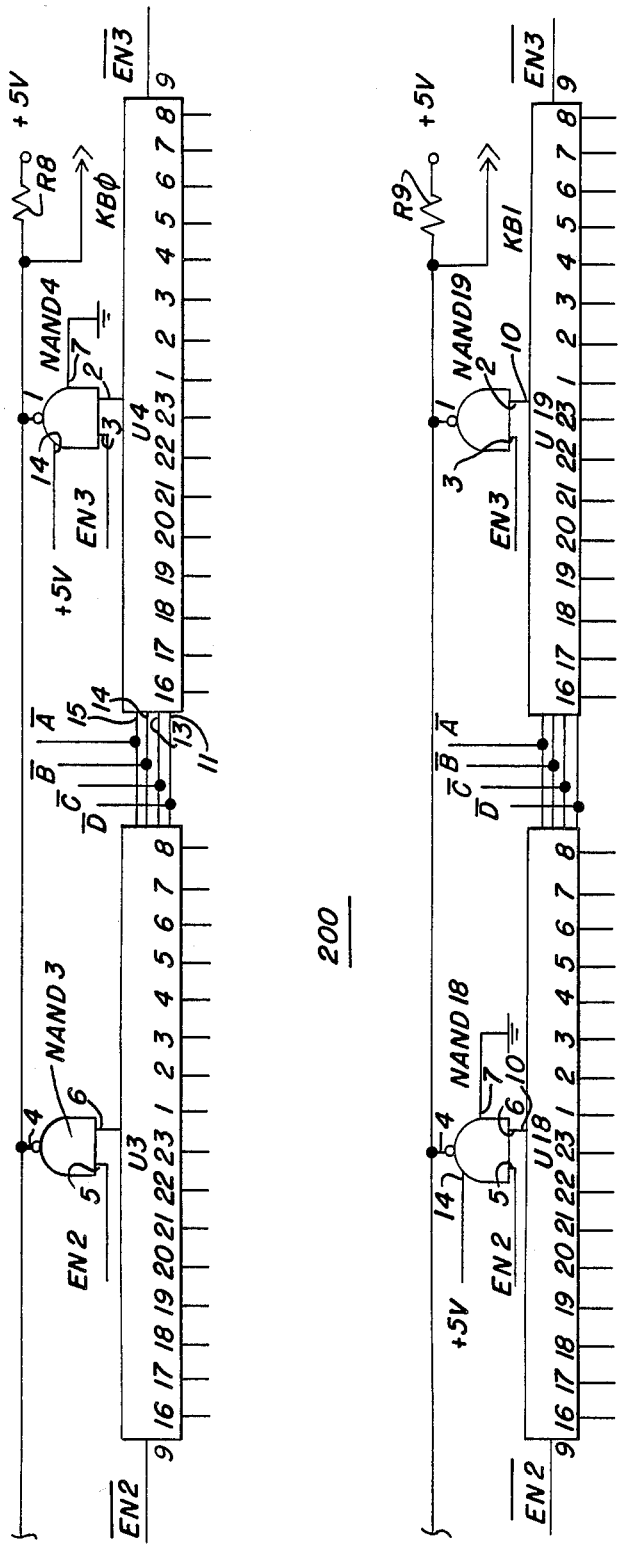

In FIGS. 7A and 7B there is shown a schematic diagram of the circuitry making up the input terminal keyboard or keypad 300 for entering strings of characters in the various fields established by the unit 20. As noted earlier the microcomputer of the unit is arranged to cause the evaluator/control means 32 to sequence in a predetermined order through the various fields. This feature facilitates the inputing of information into the unit, thereby rendering it "user friendly." However, by merely activating a sensor element for a different field one can enter information in that field out of the normal sequence, if such is desired.

As can be seen in FIGS. 7A and 7B the circuitry of the keyboard 300 basically comprises eight integrated circuit multiplexers U1, U2, U3, U4, U16, U17, U18 and U19. Each of the multiplexers are of identical construction and are of any suitable type, such as a type SN74150 sold by Texas Instruments, Inc. The multiplexers U1-U4, and their associated components (to be described later), define the left hand portion of the keyboard (that is, the fields 200, 214, 242 and 244) when the device 20 is in the data entry mode, while the multiplexers U16-U19 define the right hand side of the keyboard (that is, the alphanumeric characters and punctuation characters of field 248, the numeric characters of field 250, and the "Enter" and "Cancels" functions 252, 254 and 256, respectively) when the device is in that mode. When the unit 20 is in the test mode the multiplexers U1-U4 and associated components establish the four potential answers for each question on the left side of the test overlay 24, while the multiplexers U16-U19 establish the four potential answers for each question on the right side of the test overlay.

All of the multiplexers and their associated circuitry are constructed identically. Thus, in the interest of drawing simplicity only the details of multiplexers U1 and U16 and their associated components are shown in FIGS. 7A and 7B. As can be seen each of the multiplexers includes 16 inputs. Each input is connected to a respective contact 50 of sensor/indicator means 32. Thus, each multiplexer input is either a respective field identifier, alphanumeric character or function when the unit 20 is in the data entry mode and, when the unit is in the test mode each inputs to the multiplexer is one of four answers to one of four questions. In particular, as can be seen the inputs to multiplexer U1 are provided at pins 16, 17, 18, 19, 20, 21, 22, 23, 1, 2, 3, 4, 5, 6, 7, and 8, respectively. In the test mode those input constitute answers 1, 2, 3 and 4 to question 1, answers 1, 2, 3, and 4 to question 2, answers 1, 2, 3, and 4 to question 3, and answers 1, 2, 3, and 4 to question 4, respectively. In the data entry mode the pins 16, 17, 18, 19 and so forth constitute the "Identification" field 200, the "Aptitude" field 244, the "Interest" field 246, and the "Report Option" field 214, and so forth, respectively.

Each of the contacts 50 is connected, via a resistor, to the +5 volt bias. The resistors are disposed in a network identified herein as R7. As discussed earlier each of the contacts 50 is arranged to be engaged by the grounded probe 60. Thus, when an answer/field/character or function is selected by engaging its contact 50 with the grounded probe 60 the associated pin of the multiplexer is brought to ground potential.

The multiplexers are arranged to be sequenced under the control of the microprocessor to enable the signals appearing at their inputs to be provided sequentially at their outputs for use by the microprocessor. In accordance with the preferred embodiment of this invention one multiplexer from the left hand side of the front panel and one multiplexer from the right hand side are accessed at the same time, with their corresponding inputs sequenced simultaneously. Thus, multiplexers U16 and U1 are sequenced simultaneously, followed by the sequencing of multiplexers U17 and U2, followed by the simultaneous sequencing of multiplexers U18 and U3, and thereafter followed by the simultaneous sequencing of multiplexers U19 and U4. The sequencing cycle then repeats The simultaneous sequencing of the multiplexers is effected under the control of "Enable" signals provided from a "Multiplexer Select Register" U6. As can be seen that register is a conventional integrated circuit Four Bit Latch of any suitable type, such as type SN7475 sold by Texas Instruments, Inc., and includes four input lines provided at pins 2, 3, 6, and 7, respectively, and eight output lines provided at pins 16, 15, 14, 10, 11, 9, and 8, respectively. The output signals which appear at those pins are $\overline{EN0}$, EN0, $\overline{EN1}$, EN1, $\overline{EN2}$, EN2, and $\overline{EN3}$, EN3, respectively. The $\overline{EN0}$ signals are provided to pin 11 of each multiplexer U1 and U16, the EN1 signals are provided to pin 9 of each multiplexer U2 and U17, the EN2 signals are provided to pin 5 of multiplexer U3 and U18, and the $\overline{EN3}$ signals are provided to pin 3 of each multiplexer U4 and U19. The input signals to the register U6 are provided at input pins 2, 3, 6 and 7, respectively, from the microprocessor and are designated as KBSEL0, KBSEL1, KBSEL2, and KBSEL3. These input signals select the multiplexers to be accessed.

The sequencing of each of the multiplexers to select which of the sixteen inputs is to be provided to its output is effected under the control of signals received from a Multiplexer Address Register U5. That register is also a conventional integrated circuit Four Bit Latch of any suitable type, such as type SN7475 sold by Texas Instruments, Inc. The register U5 provides multiplexer addressing output signals $\overline{A}$, $\overline{B}$, $\overline{C}$, and $\overline{D}$, on pins 1, 14, 11 and 8, respectively. The input signals to register U5 are provided on pins 2, 3, 6, and 7 from the microprocessor. The output signals $\overline{A}$, $\overline{B}$, $\overline{C}$, and $\overline{D}$, of U5 are provided to "Select" pins 11, 13, 14 and 15, respectively, of each of the multiplexers.

The output of each multiplexer is provided at its pin 10 and serves as one input to an associated inverting NAND gate. Thus eight NAND gates NAND1, NAND2, NAND3, NAND4, NAND16, NAND17, NAND18, and NAND19, are provided and are connected via one of their input pins to the respective output pins 10 of the multiplexers U1, U2, U3, U4, U16, U17, U18 and U19. The NAND gates NAND1-NAND4 are preferably formed as a quad NAND gate integrated circuit of any suitable type, such as a type SN7401 sold by Texas Instruments, Inc., while NAND gates NAND 16-19 are similarly constructed. The other input to each NAND gate serves as the enable input and is connected to receive a respective complimentary enable signal from the Multiplexer Select Register U6. Thus, output pin 10 of the multiplexer U1 is connected to input pin 12 of the NAND1 gate. The enable input to gate NAND1 is provided at pin 11 and receives the enable signal $\overline{EN0}$. The output of the NAND1 gate is provided at pin 13. In a similar manner the output pin 10 of multiplexer U2 is connected to pin 8 of gate NAND2, while the enable input pin 9 of that gate receives the enable signal $\overline{EN1}$. The output of NAND2 is at pin 10. The output pin 10 of multiplexer U3 is connected to input pin 6 of gate NAND3, while the enable input pin 5 to that gate is provided with the enable signal $\overline{EN2}$. The output of NAND3 is at pin 4. The output pin 10 of multiplexer U4 is connected to input pin 2 of NAND4, while the enable input pin 3 is provided with enable signal $\overline{EN3}$. The output of NAND4 is at pin 1. The 5 V bias for the quad NAND gate composed of U1-U4 is provided at pin 14, while its pin 7 is connected to ground.

The output pins 13, 10, 4 and 1 of multiplexers U1-U4 are connected together to keyboard output line KB0 and to one side of a resistor R8, the other side of which is connected to +5 volt bias. The NAND gates NAND 16-NAND 19 are constructed similarly to NAND gates NAND1-NAND4 and are connected to multiplexers U16 to U19 in a similar manner, as also shown in FIGS. 7A and 7B. Thus, the output of the NAND gates NAND16–NAND19 are conneted together to Keyboard output line KB1 and to side of a resistor R9, the other side of which is connected to the +5 bias.

As will be appreciated by those skilled in the art with the circuitry of FIGS. 7A and 7B upon the sequencing of the multiplexers as just described the signals appearing on lines KB0 and KB1 represent the state of the contact associated with each of the inputs to each of the multiplexers, and thus represent either question answers or input data, depending on the mode of operation then in progress.

As mentioned earlier when the device is in the data entry mode the LED's associated with their respective sensors defining various fields are illuminated in a prescribed sequence under the control of the microprocessor and based on the programming stored in the system, e.g., in a ROM (not shown). Thus, each LED 54 is connected via circuit means, not shown, to achieve that end. That circuitry also enables the illumination of any LED's associated with any sensor which is contacted by the probe.

In FIG. 8 there is shown the sequence of operation of the device 20 in the data entry mode. As can be seen therein when the system goes into the data entry mode the test administrator is called upon to select a data entry option. As noted earlier the system is set up so that it automatically sequences through the various fields in a prescribed order. Thus, when the data entry mode commences the LED 54 associated with "Identification" field 200 is illuminated to indicate to the test administrator that identification data should be entered. If the administrator wishes to enter some data in any identification field the probe 60 is brought into engagement with contact 50 associated with the illuminated field 200. The first of the identification fields consists of the name of the person taking the test. Thus, the LED 54 associated with the "Name" field 202, is illuminated automatically. If the administrator wishes to enter information regarding the name of the person taking the test, the test administrator takes the probe 60 and touches it tip to the contact(s) 50 associated with the alphanumeric characters making up the name of the test taker to enter this keyed data into the buffer. The next character is then entered in the buffer by touching its contact with the probe. In the event that any character is entered erroneously or if the administrator, for any reason, wishes to clear the buffer, the probe is then brought into contact with the contact associated with the "Cancels" function 256. This action causes the buffer to be cleared and readies the system to accept new key data which can be entered for that particular field or for another field, by touching the probe to the contact associated with the field for which the information is to be entered. Assuming that the information as contained in the buffer is correct and is desired to be stored into the unit for later use, the operator then touches the probe 60 to the contact 50 associated with the "Enter" function 252, whereupon the signals stored in the buffer are moved to addressable memory, e.g., RAM (not shown), in the unit 20. The evaluator/control means 34 then determines if there are any other fields for which data is to be entered. If so that means normally sequences to that next field for the reception of data. Alternatively, the test administrator may select a different field for which data is to be entered. In the normal sequence of operation after data in the "Name" field 202 has been entered, the system then sequences to accept data for "I.D. number" field 204 and thereafter for the "Date" field 206, the "Facility" field 208, and the "Remarks" field 210.

It should also be pointed out that the data in any field can be overwritten by merely activating that field by touching the probe to its contact followed by the selection of the characters for that field and the entering of the same via the "Enter" function contact.

Previous test scores can be entered by actuating the contact 50 associated with the particular field, or type of test, e.g., Aptitude 244, Interest 246, etc., followed by actuating the appropriate contacts 50 of the numerical field 250 to enter the test score and then the "Enter" function contact 254 to move the data to memory.

In FIG. 9 there is shown a preferred embodiment of the data entry overlay 26. However, it should be pointed out at this juncture that other data entry overlays can be used, such as for different language alphabets and punctuation. Each of the data entry overlays will also be appropriately coded by the appropriate number of holes 37 at the top thereof so that the mode sensor means 35 and associated evaluator/control means 32 can recognize which particular data entry overlay is in place in a similar manner as occurs with the testing overlays 26.

It must be pointed out at this juncture that when the device is in the data entry mode it may be used as merely a data entry/storage device to receive and store data for use by any component connected to its RS232 serial port.

Without further elaboration, the foregoing will so fully illustrate our invention that others may, by applying current or future knowledge, readily adopt the same for use under various conditions of service.

I claim:

1. An electronic testing device comprising a housing, first and second indicia means, sensor means for sensing said first and second indicia means and operating mode selector means, said testing device being arranged for either testing operation or data entry operation in response to said mode selector means, said first indicia means comprising first overlay means arranged to be releasably secured to said housing and containing indicia forming a plurality of questions and a plurality of possible answers corresponding to said questions, said first overlay means comprising first coding means for cooperation with said sensor means on said housing to specify a set of correct answers to said questions when said device is in said testing mode, said device additionally comprising plural selector means arranged when actuated to select a desired answer for each of said questions and for providing an electrical signal indicative thereof, and computer-based means responsive to said signals for determining the degree of correspondence between answers selected and correct answers to said questions to provide scoring information, said second indicia means defining a plurality of alphanumeric characters associated with respective ones of said plural selector means, whereupon when one of said selector means is actuated it provides an electrical signal indicative of a respective one of said plural alphanumeric characters, with said signals being provided to said computer based means, whereupon said device can provide output information including selected data input during said data entry mode as well as scoring information.

2. The electronic testing device of claim 1 wherein said second indicia means comprises second overlay means comprising second coding means for cooperation with said sensor means.

3. The electronic testing device of claim 2 wherein said plural selector means comprise respective electrical contacts and associated indicators and wherein said first and second overlay means include openings for said contacts and said indicators.

4. The electronic testing device of claim 1 wherein said plural selector means comprise respective electrical contacts and associated indicators and wherein said first overly means includes openings for said contacts and said indicators.

5. The electronic testing device of claim 1 wherein said second indicia means also define a plurality of information fields for which said alphanumeric characters can be entered.

6. The electronic testing device of claim 5 wherein said second indicia means comprises second overlay means comprising second coding means for cooperation with said sensor means.

7. The electronic testing device of claim 6 wherein said plural selector means comprise respective electrical contacts and associated indicators and wherein said first and second overlay means includes openings for said contacts and said indicators.

8. The electronic testing device of claim 7 further comprising a memory in said device, and wherein said second indicia means also define means for entering the alphanumeric characters into a selected field by storing the same in said memory in the device.

9. The electronic testing device of claim 1 wherein said second indicia means also define a plurality of fields for which said alphanumeric characters can be entered and wherein said device sequences through said fields in a predetermined order as established by said computer based means.

10. The electronic testing device of claim 9 wherein said second indicia means comprises second overlay means comprising second coding means for cooperation with said sensor means.

11. The electronic testing device of claim 10 wherein said plural selector means comprise respective electrical contacts and associated indicators and wherein said second overlay means includes openings for said contacts and said indicators.

12. The electronic testing device of claim 11 wherein said indicators provide a visual signal.

13. The electronic testing device of claim 1 additionally comprising means for providing signals indicative of said output information to printer means for producing a hard copy report.

14. The electronic testing device of claim 13 additionally comprising means for providing signals indicative of said output information to an optional computer or other peripheral device.

15. The electronic testing device of claim 1 wherein said second indicia means are permanently located on said housing.

* * * * *